Patented Dec. 7, 1948

2,455,813

UNITED STATES PATENT OFFICE 2,455,813

WORKING UP OF MAGNESIA ROCK, AND PURIFICATION OF MAGNESIUM CARBONATE

Robert A. Schoenlaub, Tiffin, Ohio, assignor to Basic Refractories, Inc., Cleveland, Ohio, a corporation of Ohio No Drawing. Application October 7, 1943, Serial No. 505,363

6 Claims. (Cl. 23—67)

This invention relates to improvements in working up magnesia from material containing impurities. By its use, a magnesia of higher grade can be produced, at low costs.

A cheap concentration of magnesium and calcium constituents can be made, on calcination of dolomite, hydration and carbonation in an aqueous slurry to calcite ($CaCO_3$) and nesquehonite ($MgCO_3 \cdot 3H_2O$), and separation of these by froth flotation or other physical means. As no washing is required and brines do not have to be wasted, and filtration is reduced to a minimum and may be easily accomplished, this method is cheaper than older conventional methods. The separation by crystallization into discrete grains of magnesium and calcium carbonate however is not always inherently clean. Nesquehonite so obtained may contain occluded calcite, the calcite may be physically attached to the nesquehonite, or the nesquehonite may grow into or from an aggregate of calcite. Such conditions decrease the effectiveness of the separation and, to a degree, cause contamination of the final product.

The present invention involves a method by which physical attachment of the magnesium carbonate to the calcium carbonate, or the reverse, may be prevented, and by its use a much higher grade of product can be obtained. Other advantages will be apparent from the following description.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

Magnesia material for the process may be dolomite or magnesium oxide or hydroxide rocks, including relatively pure dolomite, impure dolomite, predazzite, pencatite, impure magnesite, etc. Also, it may be magnesium silicates with which limestone or dolomite has been fired to give dicalcium silicate and magnesia. The only limitation is that the material must provide a reactive form of magnesia. For conciseness all such materials are hereinafter referred to as "dolomite."

The raw material is preliminarily crushed, if necessary, and calcined to a suitable temperature. The calcination temperature should not be so high that it makes the magnesia insensitive to reaction nor should it be calcined so that, on slaking, it forms slimes or colloidal hydroxides. Such slimes are formed on hydration of extremely active material. Usually the temperature should be adjusted to give an incomplete or differential calcination so that all of the magnesium carbonate is changed to the oxide and the major part of the calcite is left undecomposed.

The calcined material is pulverized and mixed with water to form a slurry. The dolomite grains preferably should be about 200 mesh and yet contain little —5 micron sizes. The slurry density should be about 4–7 percent solids on the calcined basis. This hydration and pulverization may be accomplished by any desired combination of milling and classification used in conventional practice.

The suitably prepared slurry is then treated with carbon dioxide. The concentration of the gas may be such as derived from the calcination operation. A 30 per cent concentration is satisfactory. Certain precautions and procedures may be used to obtain more discrete forms of nesquehonite and calcite. The carbonating may be done at any temperature from about 90° F. down to the freezing point of water and may consume a time from a few hours to several days, and an open system may be employed, as it is generally not necessary to operate under pressure.

After treatment, the slurry is subjected to separation, as for instance froth flotation. With suitably prepared slurry, the flotation is quite simple. All that is required is a collector to the amount of about 1 pound per ton of solids. The collector may be any one of a number of organic acids or alkali salts of organic acids, of which sodium oleate, sodium palmitate, or sodium naphthenate or their corresponding acids are examples. The collector alone provides an adequate but somewhat brittle froth. A hydrogen ion concentration of about 8 pH is satisfactory for flotation. Under such conditions, the hydrous magnesium carbonate is concentrated in the froth and calcite remains in the tailings.

With proper operation along such lines, a product of the following analysis may be obtained, on a calcined basis:

|  | Per cent |
|---|---|
| $SiO_2$ | 0.02 |
| $R_2O_3$ | 0.21 |
| $CaO$ | 14.80 |
| $MgO$ | 84.00 |

The recovery is about 85 per cent of the magnesia in the original stone.

Following this one stage of crystallization, the product is subjected to recrystallization according to the procedure to be described. The procedure can best be understood from the fundamental relations between nesquehonite (MgCO$_3$.3H$_2$O)

and lansfordite (MgCo$_3$.5H$_2$O).

Nesquehonite crystallizes in long thin orthorhombic prisms. These prisms may exhibit parallel growth or may even form spherulites radiating from a particle of calcite. Lansfordite crystallizes in the monoclinic system in large blocky or equiaxial crystals. The significance of this is that recrystallization from one state to another produces a profound physical change which may be utilized for purification.

The physical conditions causing either conversion from lansfordite to nesquehonite or the reverse can be accurately controlled. Nesquehonite forms in a fairly broad temperature range of from about 70° F. to 122° F. Somewhere above 122° F. a basic carbonate forms. Lansfordite forms between about 32° F. and 46° F. Between 46° and 70° F. lansfordite or nesquehonite or a mixture thereof may form, depending upon the temperature, the speed of carbonation or the partial pressure of CO$_2$. In this range, the formation of lansfordite is favored by high rates of carbonation or high partial pressures of CO$_2$ and lower temperatures. Nesquehonite formation is similarly favored by slower rates of carbonation and temperatures in the higher part of the range of 46° F. to 70° F. This affords a means of obtaining lansfordite or nesquehonite on original carbonation or of recrystallizing from one form to another after formation. Also, this may be brought about at a single temperature between 46° F. and 70° F. by change in the partial pressure of carbon dioxide, or it may be brought about by change of temperature, or it can be brought about by change in both the partial pressure of CO$_2$ and temperature. By forming either lansfordite or nesquehonite and converting one or more times, the impurities entrained in the crystals can be worked down to very low limits.

In practice, it has been found that the conversion of lansfordite to nesquehonite readily occurs in a matter of an hour or two. The conversion of nesquehonite to lansfordite is slower. Both conversions may be speeded and the quality and size of the resulting crystals controlled and improved by seeding, but this is optional. Also, the blocky nature of lansfordite crystals favors a more complete separation than does fine prismatic nesquehonite. Furthermore, the conditions favoring the formation of lansfordite also favor a cleaner product and a faster removal of the magnesia from the residual calcite. Each form of the magnesium carbonate is susceptible to flotation, but may be fouled and rendered nonfloatable by other substances, of which magnesium hydroxide is an example.

Usually it is preferred that the crystals be grown as lansfordite. As mentioned, this procedure speeds the reaction, removes the magnesia from the residual calcite faster and to a greater degree and yields a more separable form of magnesium carbonate. The lansfordite is then removed by flotation from the bulk of the calcite. The froth and the contained solids are then diluted, the temperature raised or CO$_2$ partial pressure decreased or both, and the lansfordite is converted to nesquehonite and again floated. Ordinarily about a 30 per cent concentration of CO$_2$ is applied, and in open or closed system.

My invention embraces the inversion of either lansfordite or nesquehonite for the purpose of improving the final product or facilitating separation in any way and further embraces any number of such cycles. It similarly embraces the purification of magnesia substances by inversion of one hydrated crystal form to another.

As an example: I burn dolomite from the Niogaran formation in northern Ohio of the following composition:

| | Percent |
|---|---|
| Ig. loss | 47.3 |
| SiO$_2$ | 0.23 |
| Fe$_2$O$_3$ | 0.057 |
| Al$_2$O$_3$ | 0.065 |
| CaO | 30.3 |
| MgO | 21.2 | to an ignition loss of 18 per cent. I pulverize this and form an aqueous slurry containing 5 per cent solids on a calcined basis. I adjust this to a temperature of 60° F. and carbonate by bubbling a 30 per cent concentration of CO$_2$ so that the reaction is complete in about 5 hours. I add 1 pound of sodium naphthenate per ton of solids as collecting agent, and condition and float the lansfordite from the bulk of the residual calcite. I dilute the froth so obtained to about 15 per cent total solids, raise the temperature to about 75° F. and add carbon dioxide in similar concentration slowly. After 3 hours I again add collecting agent and float. The analysis of the resulting product is:

| | Per cent |
|---|---|
| SiO$_2$ | 0.01 |
| R$_2$O$_3$ | 0.1 |
| CaO | 7.0 |
| MgO | 93.0 |

Other modes of applying the principle of the invention may be employed, change being made as regards the details described, provided the features stated in any of the following claims, or the equivalent of such, be employed.

I therefore particularly point out and distinctly claim as my invention:

1. In a process of separating compounds of magnesium and calcium, calcining dolomite to an ignition loss of about 18 per cent, grinding, making an aqueous slurry containing about 5 per cent solids on a calcined basis, adjusting the temperature to a range of from 32° F. to 65° F., bubbling carbon dioxide gas of about 30 per cent concentration into the slurry for about 5 hours, adding sodium naphthenate at the rate of about 1 pound per ton of solids, flotation-separating lansfordite in the froth from calcium carbonate, diluting the obtained froth to about 15 per cent total solids, raising the temperature to about 75° F. and bubbling carbon dioxide gas into the slurry for about 3 hours to invert the lansfordite to nesquehonite, adding sodium naphthenate and flotation-separating the obtained nesquehonite from calcium carbonate.

2. In a process of separating compounds of magnesium and calcium, calcining dolomite without substantial decomposition of the calcium carbonate, making a slurry of the calcined material, bubbling carbon dioxide into the slurry under such temperature conditions as to form lansfordite, adding a flotation collecting agent and flotation-separating the lansfordite in the froth, diluting the obtained froth, bubbling carbon dioxide gas into the slurry under such temperature conditions as to invert the lansfordite to nesquehonite, adding a flotation collecting agent and separating the nesquehonite.

3. In a process of separating compounds of magnesium and calcium, calcining dolomite without substantial decomposition of the calcium carbonate, making a slurry of the calcined material, bubbling carbon dioxide into the slurry under such temperature conditions as to form nesquehonite, adding a flotation collecting agent and flotation-separating the nesquehonite in the froth, diluting the latter and bubbling carbon dioxide gas into the slurry under such temperature conditions as to invert the nesquehonite to lansfordite, and adding a flotation collecting agent and separating the lansfordite.

4. In a process of separating compounds of magnesium and calcium, calcining dolomite without substantial decomposition of the calcium carbonate, making a slurry of the calcined material, bubbling carbon dioxide gas into the slurry under such temperature conditions as to produce a crystalline form of magnesium carbonate from the group consisting of nesquehonite and lansfordite, adding a flotation collecting agent and flotation-separating the magnesium carbonate in the froth, diluting the froth with the contained magnesium carbonate and bubbling carbon dioxide gas into the slurry under such temperature conditions as to invert the said form of magnesium carbonate into the other form of said group consisting of nesquehonite and lansfordite and adding a flotation collecting agent and separating such crystalline form of magnesium carbonate from associated material.

5. In a process of separating compounds of magnesium and calcium, calcining dolomite, making a slurry of the calcined material, supplying carbon dioxide to the slurry under such temperature conditions as to precipitate out calcium carbonate, then supplying carbon dioxide to the slurry under such temperature conditions as to produce a crystalline form of magnesium carbonate from the group consisting of nesquehonite and lansfordite, rough separating the crystalline magnesium carbonate from the calcium carbonate, then making a slurry of the crystalline magnesium carbonate and supplying carbon dioxide thereto under such temperature conditions as to invert the said form of magnesium carbonate into the other form of said group consisting of nesquehonite and lansfordite, and separating such crystalline form of magnesium carbonate from associated material.

6. In a process of separating compounds of magnesium and calcium, making synthetic magnesium carbonate of crystalline form selected from the group consisting of nesquehonite and lansfordite, separating such synthetic magnesium carbonate from associated material, and repurifying such synthetic magnesium carbonate by bubbling carbon dioxide into a water slurry thereof under such temperature conditions as to invert the said form of magnesium carbonate to the other form of said group consisting of nesquehonite and lansfordite, and separating such obtained crystalline form of magnesium carbonate from associated material.

ROBERT A. SCHOENLAUB.

REFERENCES CITED

The following references are of record in the file of this patent:

UNITED STATES PATENTS

| Number | Name | Date |
|---|---|---|
| 1,573,604 | Grunwald | Feb. 16, 1926 |
| 2,208,143 | Weinig | July 16, 1940 |
| 2,358,818 | Miller | Sept. 26, 1944 |
| 2,363,030 | Weinig | Nov. 21, 1944 |
| 2,363,031 | Weinig | Nov. 21, 1944 |

FOREIGN PATENTS

| Number | Country | Date |
|---|---|---|
| 181,388 | Great Britain | June 28, 1923 |

OTHER REFERENCES

Mellor, "Inorganic and Theoretical Chemistry," vol. 4, Longmans, Green and Co., London (1923), pp. 355–357.